United States Patent
Schwartz et al.

(10) Patent No.: US 10,444,888 B2
(45) Date of Patent: Oct. 15, 2019

(54) FORCE ELECTRODES WITH NON-UNIFORM SPACING

(71) Applicant: Synaptics Incorporated, San Jose, CA (US)

(72) Inventors: Adam Schwartz, San Jose, CA (US); Shubha Ramakrishnan, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/692,191

(22) Filed: Aug. 31, 2017

(65) Prior Publication Data

US 2019/0064984 A1    Feb. 28, 2019

(51) Int. Cl.
*G06F 3/041* (2006.01)
*G06F 3/0488* (2013.01)
*G06F 3/044* (2006.01)

(52) U.S. Cl.
CPC .......... *G06F 3/0414* (2013.01); *G06F 3/044* (2013.01); *G06F 3/0412* (2013.01); *G06F 3/0416* (2013.01); *G06F 3/04883* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 8,245,165 B1 * | 8/2012 | Tiwary | G06F 17/5031 716/108 |
| 2016/0328079 A1 * | 11/2016 | Schwartz | G06F 3/0416 |
| 2017/0090674 A1 * | 3/2017 | Meng | G02F 1/13338 |
| 2017/0220162 A1 * | 8/2017 | Ko | G06F 3/0412 |

* cited by examiner

*Primary Examiner* — Carl Adams
(74) *Attorney, Agent, or Firm* — Ferguson Braswell Fraser Kubasta PC

(57) ABSTRACT

An input device includes an input surface having a first axis and a second axis, and force sensor electrodes. The force sensor electrodes have non-uniform distances between adjacent force sensor electrodes along the first axis.

20 Claims, 9 Drawing Sheets

FIG. 5.1 — Chebyshev Type 1 Points, 7 Electrodes
FIG. 5.2 — Chebyshev Type 2 Points, 7 Electrodes
FIG. 5.3 — Legendre Points, 7 Electrodes
FIG. 5.4 — Chebyshev Type 1 Points, 6 Electrodes
FIG. 5.5 — Chebyshev Type 2 Points, 6 Electrodes
FIG. 5.6 — Legendre Points, 6 Electrodes

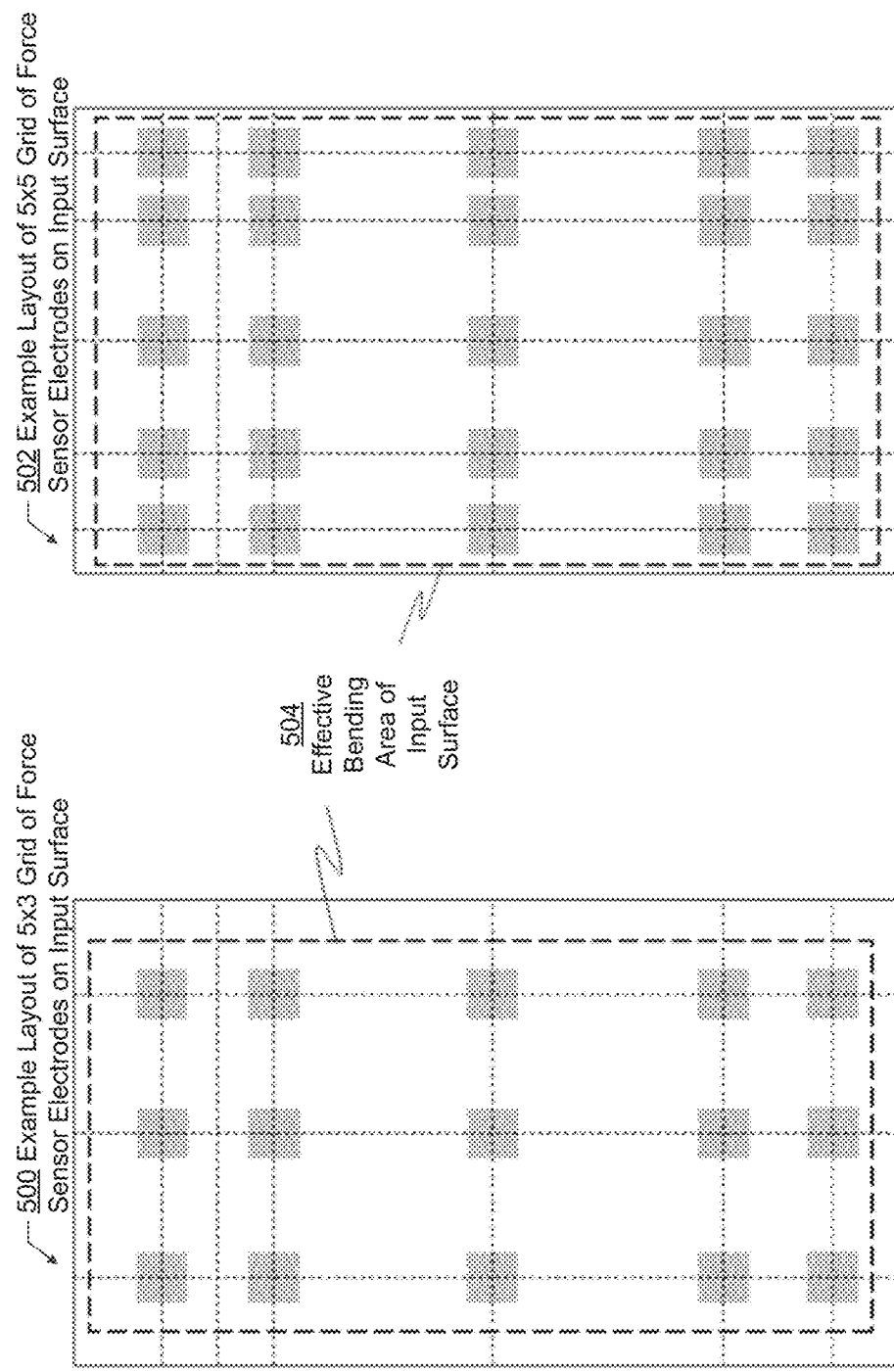
FIG. 5.7

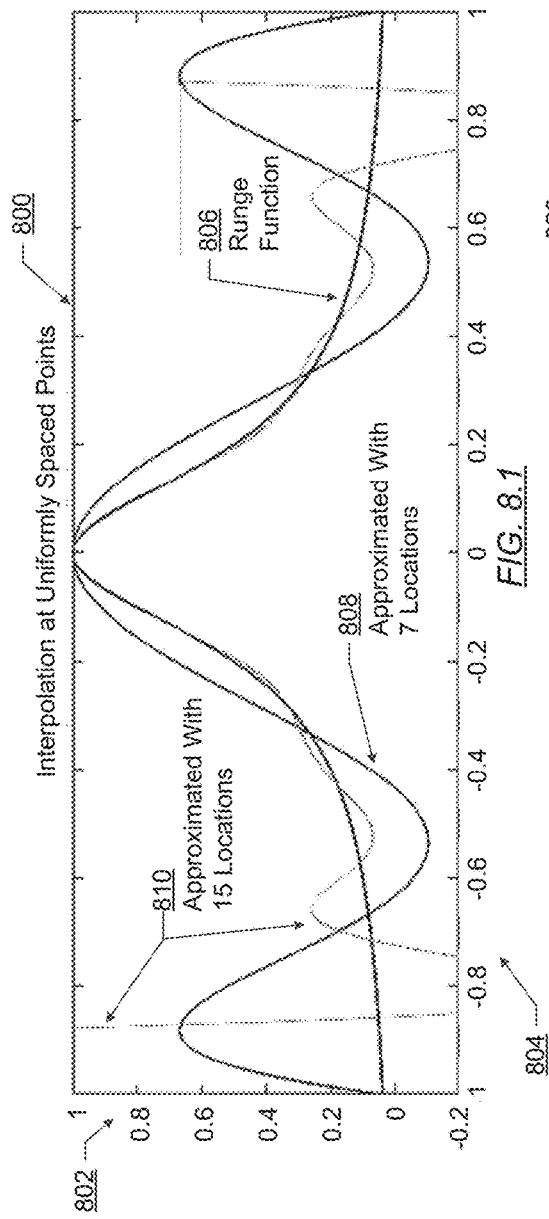
FIG. 8.1
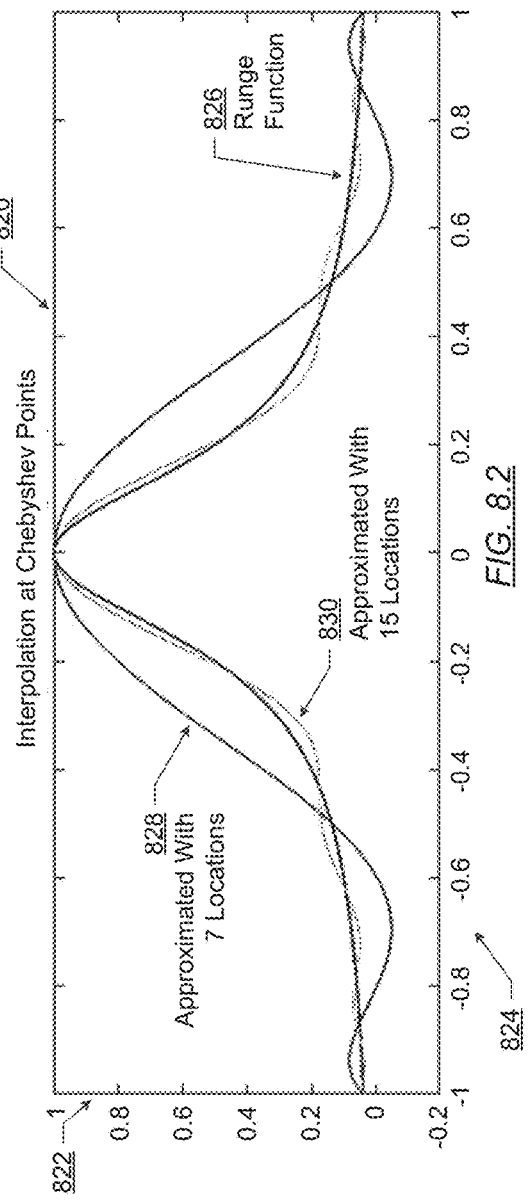
FIG. 8.2

FORCE ELECTRODES WITH NON-UNIFORM SPACING

FIELD

This invention generally relates to electronic devices and more particularly, to detection of force that includes accounting for non-uniform bending response of an input surface.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (e.g., opaque touchpads integrated in, or peripheral to, notebook or desktop computers). Proximity sensor devices are also often used in smaller computing systems (e.g., touch screens integrated in cellular phones).

Some proximity sensor devices may also detect force on the surface of the input device. The surface of the input device may have a non-uniform bending response to the same amount of force on different parts of the input surface. Thus, accurate detection of force may include accounting for the non-uniform bending response of the input surface.

SUMMARY

Force sensor electrodes with non-uniform spacing is disclosed. In one or more embodiments, an input device includes an input surface having a first axis and a second axis. A plurality of force sensor electrodes are disposed on the input surface such that the distances between adjacent force sensor electrodes are non-uniform along the first axis.

In one or more embodiments, an input device includes an input surface having a first axis, a second axis substantially orthogonal to the first axis, and a corner. The input device further includes a first force sensor electrode adjacent to the corner, a second force sensor electrode adjacent to the first force sensor electrode and located farther from the corner along the first axis than the first force sensor electrode, and a third force sensor electrode adjacent to the second force sensor electrode and located farther from the corner along the first axis than the second force sensor electrode. A first distance between the first force sensor electrode and the second force sensor electrode is smaller than a second distance between the second force sensor electrode and the third force sensor electrode.

In one or more embodiments, a processing system for an input device includes sensor circuitry configured to be coupled to positional sensor electrodes, and force sensor electrodes. The sensor circuitry is configured to obtain force measurements from the force sensor electrodes, the force sensor electrodes having non-uniform distances between adjacent force sensor electrodes along an axis. The sensor circuitry is further configured to obtain positional measurements from the positional sensor electrodes. The processing system further includes a processing circuitry configured to determine, using the plurality of positional measurements, a location of an input object on an input surface, and determine, using the location and the plurality of force measurements, force information for the input object.

Other aspects of the technology will be apparent from the following description and the appended claims.

BRIEF DESCRIPTION OF DRAWINGS

Exemplary embodiments will be described in conjunction with the appended drawings, where like designations denote like elements.

FIGS. 5.1, 5.2, 5.3, 5.4, 5.5, 5.6, and 5.7 show diagrams of example layouts of force sensor electrodes in accordance with one or more embodiments of the disclosure.

FIGS. 8.1 and 8.2 show example graphs in accordance with one or more embodiments of the disclosure.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods that facilitate improved usability.

Figure 1:
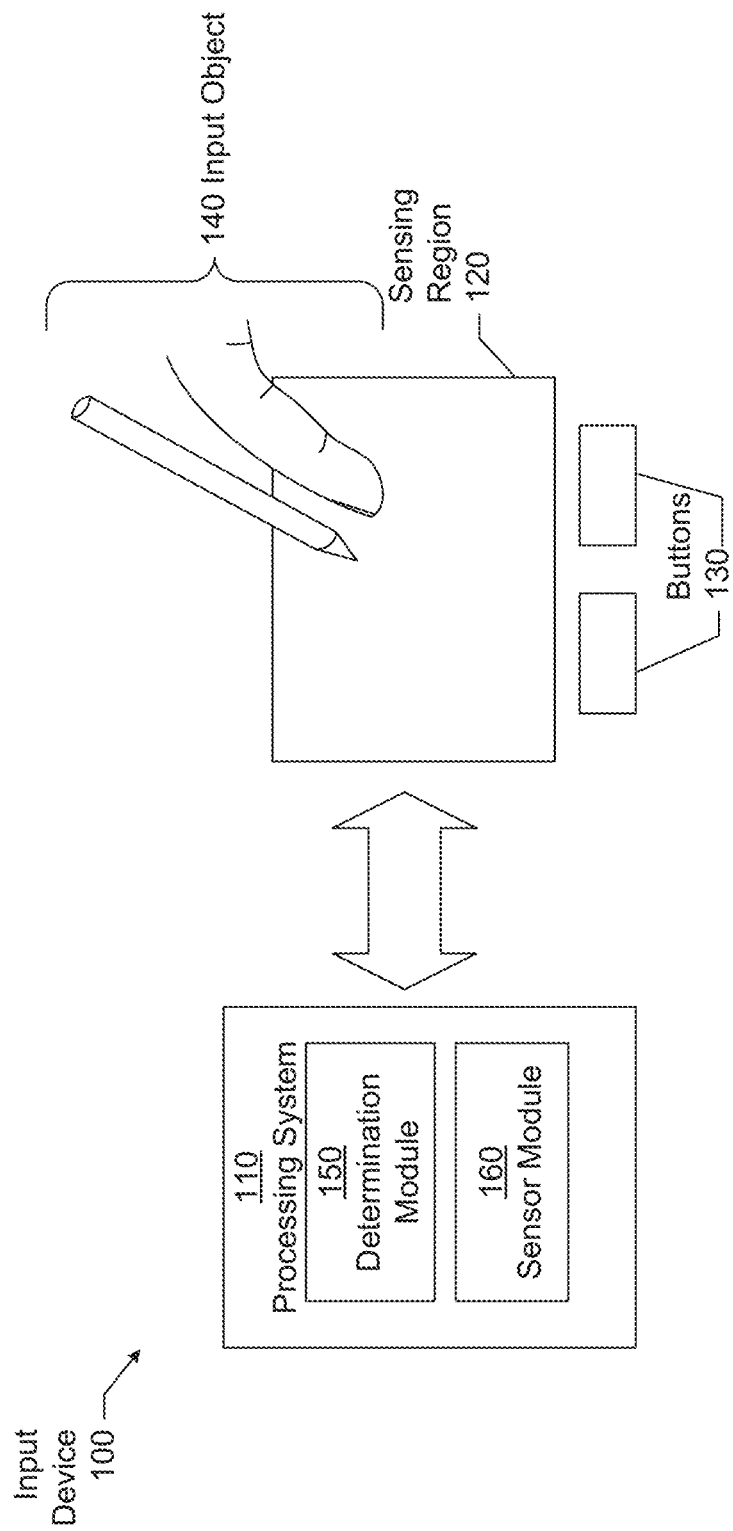
FIG. 1 is a block diagram of a system that includes an input device in accordance with one or more embodiments of the disclosure.

Turning now to the figures, FIG. 1 shows a block diagram of an exemplary input device (100), in accordance with embodiments of the disclosure. The input device (100) may be configured to provide input to an electronic system (not shown for simplicity). As used in this document, the term "electronic system" (or "electronic device") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) extends from a surface of the input device (100) in one or more directions into space, for example, until a signal-to-noise ratio falls below a threshold suitable for object detection. For example, the distance to which this sensing region (120) extends in a particular direction, in various embodiments, may be on the order of less than a millimeter, millimeters, centimeters, or more, and may vary with the type of sensing technology used and/or the accuracy desired. In some embodiments, the sensing region (120) detects inputs involving no physical contact with any surfaces of the input device (100), contact with an input surface (e.g. a touch surface) of the input device (100), contact with an input surface of the input device (100) coupled with some amount of applied force or pressure, and/or a combination thereof.

In various embodiments, input surfaces may be provided by surfaces of a housing of the input device (100) within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques. In some embodiments, the input device (100) may include one or more sensing elements configured to implement the various sensing technologies.

Some implementations are configured to provide images that span one, two, three, or higher-dimensional spaces. An image is a collection of measurements of the sensing region where each measurement corresponds to a particular position on the sensing region. For example, in capacitive implementation, a capacitive image has a capacitive measurement for each location of the sensing region. Some implementations are configured to use and/or provide projections of input along particular axes or planes. A projection is an aggregation of measurements along the axis or plane. For example, a projection may have multiple values, where each value is along a first axis, and each value is a sum of the measurements along a second axis. By way of a more specific example, a column projection may have a single value for each row of a column, where each single value corresponds to a sum of the measurement values for the row. Further, some implementations may be configured to use and/or provide a combination of one or more images and one or more projections.

In some embodiments, the input device (100) may implement resistive sensing technologies to detect user input. For example, the sensing region (120) may be formed by a flexible and conductive first layer separated by one or more spacer elements from a conductive second layer. The sensing region (120) may detect user input by creating one or more voltage gradients are created across the layers and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information of the detected inputs.

In other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user input based on a combination of the magnitude, phase, and/or frequency of the currents. The characteristics of the loop currents may further be used to determine positional information about the detected inputs.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or mutual capacitance (Also referred to as "transcapacitance"). Absolute capacitance sensing methods detect changes in the capacitive coupling between sensor electrodes and an input object. Absolute capacitance sensing measures the self-capacitance of the sensor electrode, where the self-capacitance is the amount of electric charge that must be added to a sensor electrode to raise the sensor electrode's electric potential by one unit (e.g., one volt). The self-capacitance of the sensor electrode changes when an input object is proximate to the sensor electrode. For example, an input object near the sensor electrodes may alter the electric field near the sensor electrodes, thus changing the measured capacitive coupling. In some embodiments, the input device (100) may implement by modulating sensor electrodes with respect to a reference voltage (e.g., system ground), and detecting the capacitive coupling between the sensor electrodes and input objects. The reference voltage may be a substantially constant voltage, a varying voltage, or corresponds to a system ground. Measurements acquired using absolute capacitance sensing methods may be referred to as absolute capacitive measurements.

Transcapacitance sending methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or may be system ground. The resulting signal may be affected by environmental interference (e.g., other electromagnetic signals) as well as input objects in contact with, or in close proximity to, the sensor electrodes. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include processing circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only processing circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions.

In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region. Each sensing element may have a corresponding individual value in the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While many embodiments are described in the context of a fully-functioning apparatus, the mechanisms of are capable of being distributed as a program product (e.g., software) in a variety of forms. For example, the mechanisms of the disclosure may be implemented and distributed as a software program on information-bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion of the disclosure may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosure. For example, various components may be combined to create a single component. As another example, the functionality performed by a single component may be performed by two or more components.

Figure 2:
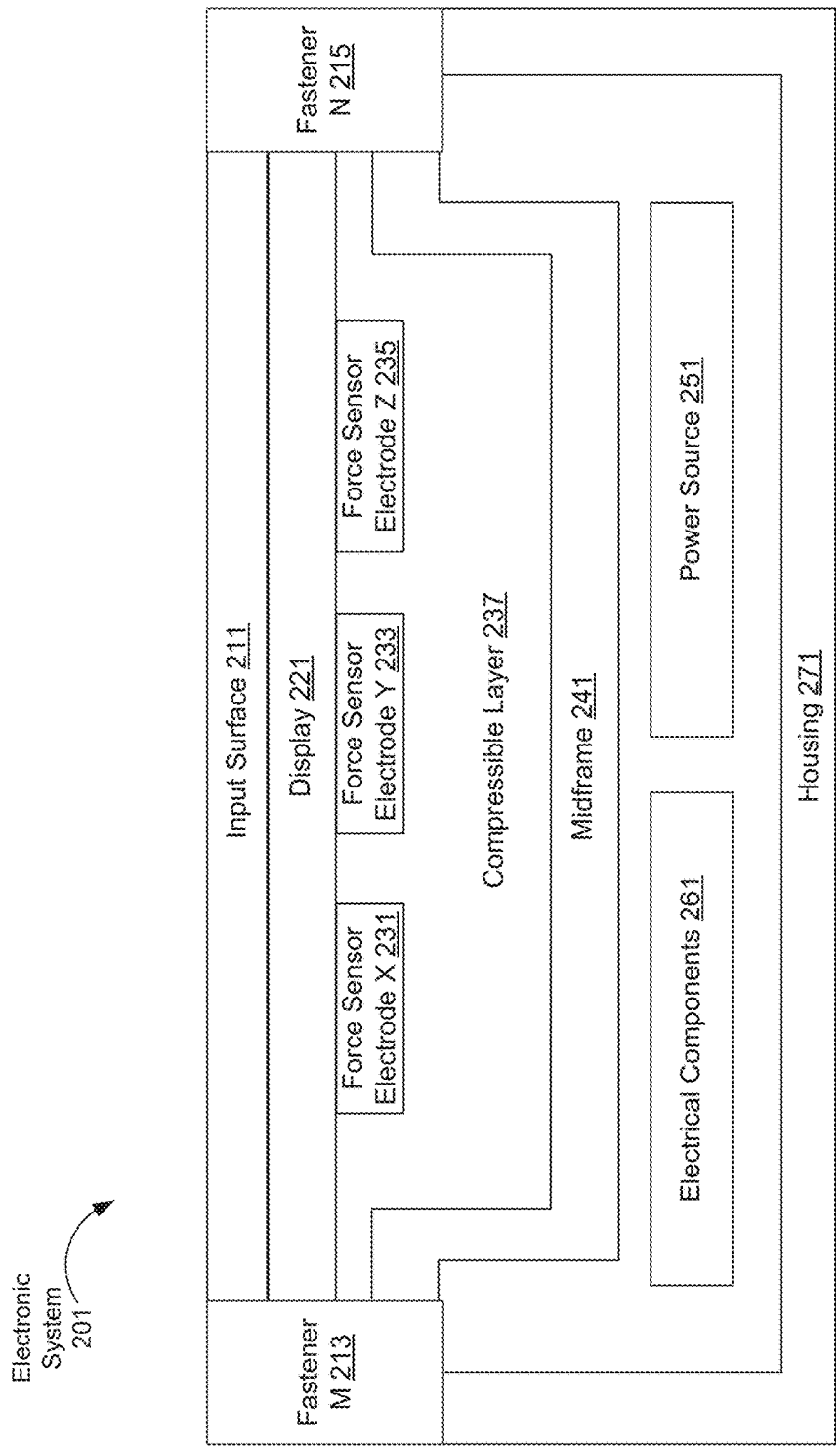
FIG. 2 is a diagram showing a side view of an input device in accordance with one or more embodiments of the disclosure.

Turning to FIG. 2, FIG. 2 shows an example cross sectional diagram of an electronic system (201) in accordance with one or more embodiments. The electronic system (201) may be a smart phone, a tablet computing device, a touchscreen, a computing device with a touchpad, or other device. As shown in FIG. 2, an electronic system (201) may include an input surface (211), display (221), force sensor electrodes (e.g., force sensor electrode X (231), force sensor electrode Y (233), force sensor electrode Z (235)), a compressible layer (237), midframe (241), power source (251), electrical components (261), and housing (271). Each of these components is described below.

The housing (271) may be metal, plastic, other material, or a combination of materials. The housing (271) may be referred to as the frame of the electronic system (201) and may hold the input device.

The input device may include the input surface (211), display (221), and the compressible layer (237) as well as various components described above with reference to FIG. 1. The compressible layer (237) may consist of air, a compressible material such as foam or a combination of air and compressible materials. The input surface (211) is the surface of the input device that may be touched by an input object. For example, the input surface (211) may be glass or other material. The display (221) is a physical device that is configured to present visual information to a user. For example, the display (221) may be any type of light emitting diode (LED), organic LED (OLED), liquid crystal display (LCD), plasma, electroluminescence (EL), or other display technology. The input surface (211) and display (221) have bending properties that define the amount of bending by the input surface (211) and display (221) in response to force at various positions along the input surface. The bending properties of the input surface (211) and display (221) refer to the amount of bend (i.e., deflection) of the input surface (211) and display (221) when subjected to an external force onto the input surface (211) and display (221). The input surface (211) and display (221) may be treated as having single bending properties or individual bending properties. Although FIG. 2 shows a distinct input surface (211) and display (221), the input surface may be an uppermost part of the display.

One or more fasteners (e.g., fastener M (213), fastener N (215)) may connect the input surface (211) and the display (221) to the housing (271) at attachment points. The fasteners may hold the display structure to the midframe. The display structure includes the input surface (e.g., cover glass or other material) which is attached to the display by a layer of optically clear adhesive. The fastener may be an adhesive (e.g., weld, solder, cement, glue), crimping, a mounting bracket or other hardware connector, or other type of fastener. The attachment points are the points at which the fastener connects the input surface (211) and display (221) to the housing (271). For example, the attachment points may be around the edges of the display structure. Other attachment points may exist. Amongst other factors, such as punch outs in the midframe (241), the fastener and locations of attachment points may affect the bending properties of the of the input surface (211) and display (221). Thus, the amount of bend may change depending on the type of fastener used and the location of the attachment points.

The electronic system (201) may further include various electrical components (261), and a power source (251). The electrical components (261) may include one or more circuit boards, such as a main board or printed circuit board assembly, that have various integrated circuits attached to the circuit boards. In another example, the electrical components (261) may include a processor, memory, and/or any other electrical devices for operating the electronic system (201).

Furthermore, the power source (251) may be hardware that includes functionality to provide electrical power to the electrical components (261), the force sensor electrodes (e.g., force sensor electrode X (231), force sensor electrode Y (233), force sensor electrode Z (235)), and a processing system (not shown). For example, the power source (251) may be a rechargeable battery with functionality to charge using an electric current obtained from an external power source connected to the electronic system (201).

In one or more embodiments, the electronic system (201) includes a midframe (241) disposed between the display (221) and the housing (271). For example, the midframe (241) may be a conductive material configured as an interior support frame, for example, for the electronic system (201). Moreover, the midframe (241) may be a piece of sheet metal, such as a shielding can. For example, the midframe (241) is a foil or plating layer attached to a non-conductive substrate. The midframe (241) may include various punch outs or cutouts for electrical and/or optical connectors that may affect the bending properties.

The force sensor electrodes (e.g., force sensor electrode X (231), force sensor electrode Y (233), force sensor electrode Z (235)) are sensor electrodes that are arranged so as to be electrically affected by a force applied to the input surface (211). Thus, measurements acquired using the force sensor electrodes indicate the amount of force applied to the input surface. Various different arrangements of force sensor electrodes may be used. The following are a few example arrangements.

In particular, FIG. 2 shows an example in which the force sensor electrodes are attached or as a part of the display. In such a scenario, absolute capacitive sensing may be used. In particular, when force is applied to the input surface, the compressible layer compresses causing the midframe to be closer to the force sensor electrodes. Based on the decrease in distance (i.e., the amount of bend or deflection), the absolute capacitance of a force sensor electrode changes, whereby the amount of change reflects the amount of the decrease and correspondingly the amount of force applied. In another embodiment of the configuration of FIG. 2, transcapacitive sensing may be used. In such a scenario, a first subset of the force sensor electrodes adjacent to the display may be transmitter electrodes and a second subset of force sensor electrodes adjacent to the display may be receiver electrodes. The transmitter electrodes may transmit transmission signals and the receiver electrodes may receive resulting signals from the transmission signals. When a force is applied to the input surface, the compressible layer compresses causing the midframe to be closer to the transmitter electrodes and receiver electrodes. The reduction of distance to the midframe changes the resulting signals received by the receiver electrodes as compared to the electronic system without force applied. Thus, the measurements of the resulting signals are affected by the amount of force applied.

By way of another configuration (not shown), a first subset of the force sensor electrodes may be located above the compressible layer and a second subset of the force sensor electrodes may be located below the compressible layer. Further, the midframe may or may not include conductive material. In the example, capacitive sensing between the first subset and second subset may be performed as described above to determine the amount of deflection, and correspondingly indicate the amount of force of the first subset to the second subset.

In another example, one or more of the force sensor electrodes (231, 233, 235) may be electrodes of the display (221) used for both display updating and force and/or touch sensing. Some of the electrodes used to update the display may be used to perform capacitive sensing. The capacitive sensing may be for force (e.g., based on capacitance being affected by an amount of compression of the compressible layer) and/or for touch (e.g., based on capacitance being affected by a position of an input object in the sensing region) to determine positional information. An example of the force sensor electrodes being electrodes of the display is discussed below and in reference FIG. 4.

The above are only a few examples. Other configurations of the electronic system to perform force sensing may be used.

Continuing with FIG. 2, the various components of the electronic system (201) cause a non-uniform displacement when force is applied to various locations of the input surface (211). In particular, when force is applied to one location on the input surface causing a displacement at the location, the various locations may also have some displacement. Additionally, an equal amount of force applied to different locations cause an unequal amount of displacement at the different locations as well as at other locations. For example, the amount of displacement at the various locations is dependent on the fasteners, attachment points, and other factors located throughout the electronic system. The capacitances measured by force sensor electrodes are each directly affected by the amount of displacement at the location of the corresponding force sensor electrode. The bending response is the actual amount of displacement at the various locations of the input surface for various amounts of force applied to different locations of the input surface. The bending response model is an estimate of the bending response. Although the above is discussed with respect to displacement, the above may be capacitances. In such a scenario, the bending response is the actual relationship between capacitances that are measured by the force sensor electrodes and to the amount of force applied the various locations of the input surface. Further the bending response model may be the estimated relationships between capacitances and amount of force to particular locations. As with any estimate, an error exists between the bending response and the bending response model.

Figure 3:
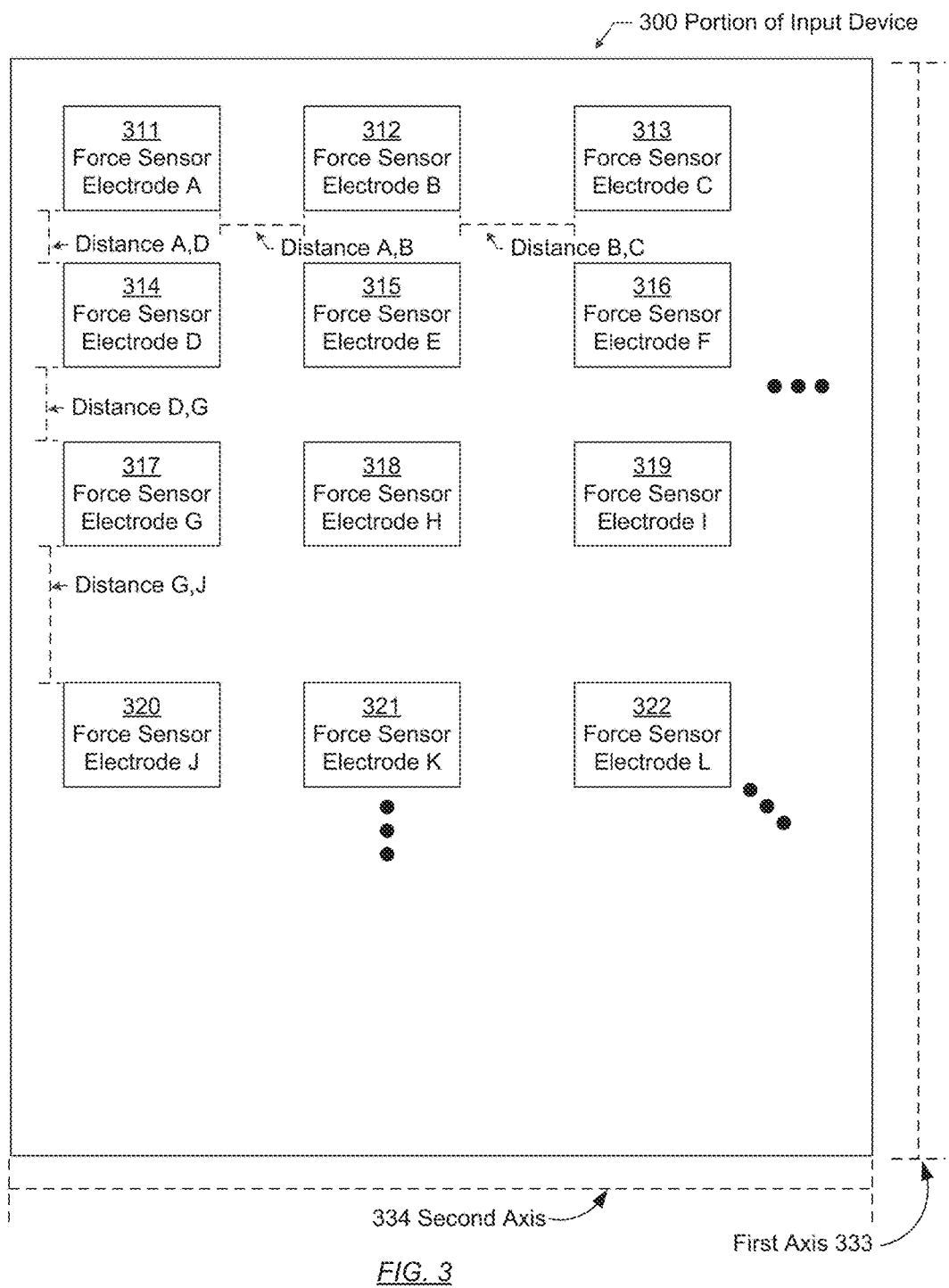
FIGS. 3 and 4 are diagram showing layouts of force sensor electrodes in accordance with one or more embodiments of the disclosure.

FIG. 3 shows an example diagram of top down perspective of a force sensor electrode layout on a portion of an input device (300) in accordance with one or more embodiments of the technology. The following example is for illustrative purposes only and not intended to limit the scope of the technology. For example, more or fewer force sensor electrodes may exist.

As shown in FIG. 3, the input device (300) includes a first axis (333) and a second axis (334). The first axis (333) is orthogonal to the second axis (334). The first axis (333) and the second axis (334) are axes of the input surface. In particular, the first axis (333) and the second axis (334) are parallel to the plane of the input surface. As used herein, orthogonal includes substantially orthogonal as desired by design choice and manufacturing tolerances. Further, although FIG. 3 shows the first axis (333) as being longer than the second axis (334), the first axis (333) may be the same size as or shorter than the second axis (334).

The input device (300) is shown with various force sensor electrodes (e.g., force sensor electrode A (311), force sensor electrode B (312), force sensor electrode C (313), force sensor electrode D (314), force sensor electrode E (315), force sensor electrode F (316), force sensor electrode G (317), force sensor electrode H (318), force sensor electrode I (319), force sensor electrode J (320), force sensor electrode K (321), force sensor electrode L (322)). As shown, the force sensor electrodes have non-uniform spacing between sensor electrodes. For example, the distance between force sensor electrode A (311) and force sensor electrode D (314) is distance A,D (324) which is smaller than distance D,G (326), which is the distance between force sensor electrode D (324) and force sensor electrode G (317). The distance is the difference between two adjacent sides of adjacent force sensor electrodes. Accordingly, the distance is the measure of the space between sensor electrodes. Rather than distance, other measures of space such as area may be used. By having a non-uniform space between the sensor electrodes, the amount of error between the bending response model and the bending response is reduced. By being able to create a more accurate bending response model (i.e., through the reduction of the error), using the bending response model provides a better estimate of the force applied to the input surface.

In one or more embodiments of the disclosure, the non-uniform spacing has larger distances toward the middle of the sensing region than toward the outside of the sensing region. The non-uniform spacing may monotonically decrease from the center toward the outside of the sensing region. Further, the non-uniform spacing may be symmetric about the center. For example, if a line bisects either axis, the non-uniform spacing is symmetric about the line.

Figure 4:
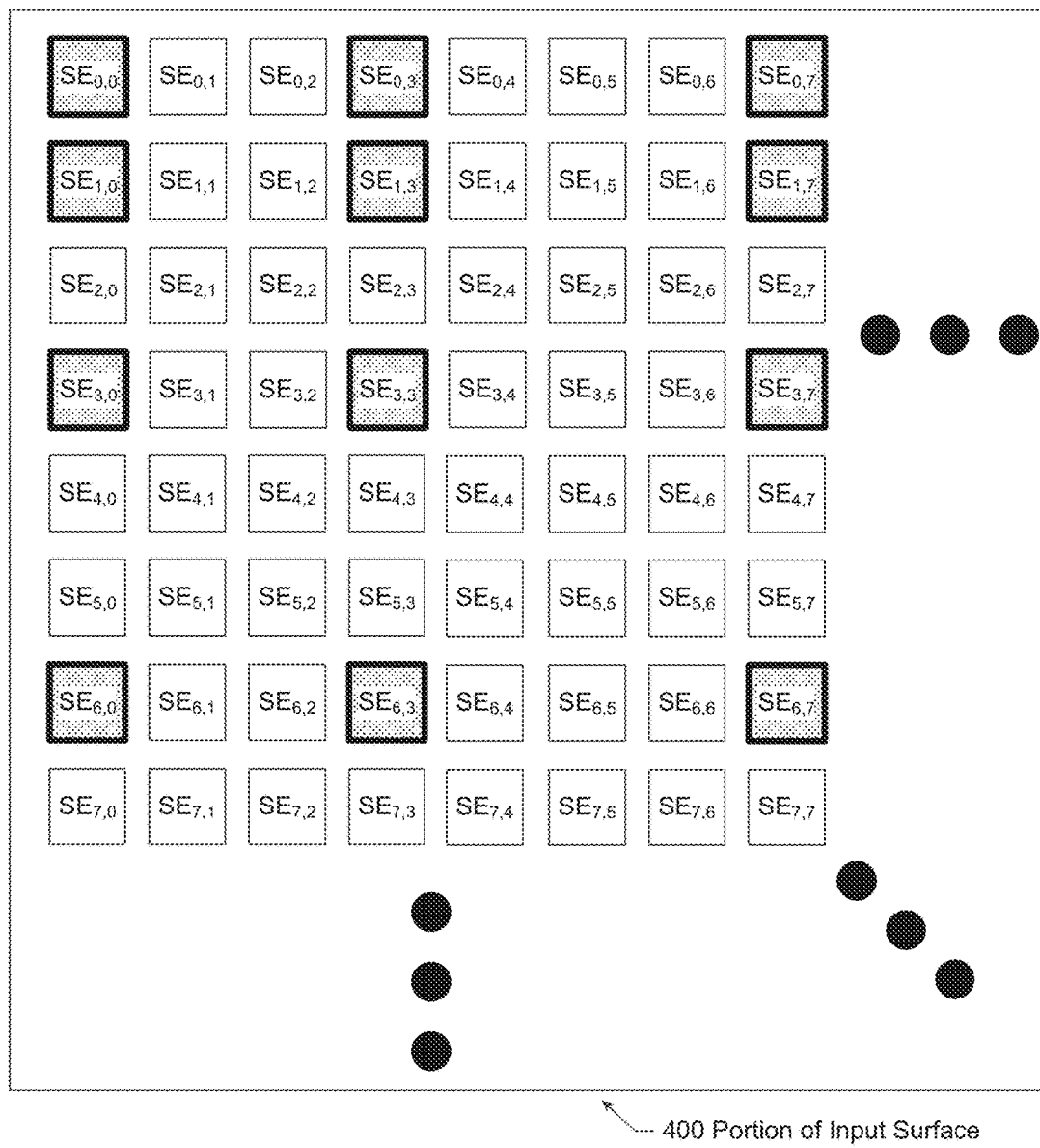

Different mechanisms may be used to achieve the non-uniform spacing. For example, in the embodiment shown in FIG. 2, the force sensor electrodes are in a separate layer and the non-uniform spacing is between adjacent electrodes. In some embodiments, at least some of the force sensor electrodes are part of the display electrodes. FIG. 4 is a block diagram of an example layout of sensor electrodes (denoted as SE) on a portion of the input surface (400) in accordance with one or more embodiments of the technology. In FIG. 4, the sensor electrodes are arranged in a grid. In the grid, each location in the grid is a distinct sensor electrode. For example, $SE_{0,0}$ is a distinct and separate sensor electrode than $SE_{0,1}$. Each sensor electrode may be connected to a separate trace (not shown) and to the processing system. Thus, each sensor electrode may be individually driven. Driving a sensor electrode may include modulating the voltage on the sensor electrode to obtain absolute capacitive measurement of the sensor electrode. When each sensor electrode is modulated (e.g., the voltage on the sensor electrode is modulated), an absolute capacitive image is generated. In the absolute capacitive image, each modulated sensor electrode generates an absolute capacitive measurement value in the image. By way of another example, the sensor electrodes may be used to perform mutual capacitive sensing. In the example, a sensor electrode may be a transmitter electrode and another sensor electrode may be a receiver electrode to perform the mutual capacitive sensing. Other variations of the mutual capacitive sensing may be used.

The sensor electrodes may be in-cell sensor electrodes. In-cell sensor electrodes are sensor electrodes that cause the display of color on the input surface by creating a voltage differential. Thus, in at least some embodiments, at least a portion of the sensor electrodes that directly cause the display of color on the input surface may be used to obtain capacitive measurements of input objects on the input surface and in the sensing region.

In the example of FIG. 4, a subset of the sensor electrodes is used as force sensor electrodes. A selected subset of the sensor electrodes may be used for display updating, touch sensing, and force sensing. In FIG. 4, the selected subset has shading and darker borders (e.g., $SE_{0,0}$, $SE_{0,3}$, $SE_{0,7}$, $SE_{1,0}$, $SE_{1,3}$, $SE_{1,7}$, $SE_{3,0}$, $SE_{3,3}$, $SE_{3,7}$, $SE_{5,0}$, $SE_{5,3}$, $SE_{5,7}$). As shown, the selected subset has non-uniform spacing amongst the selected subset. Thus, although the sensor electrodes have uniform spacing, the subset that is selected has non-uniform spacing.

FIGS. 5.1-5.6 show example non-uniform spaces of force sensor electrodes along a particular axis. In FIGS. 5.1-5.6, the line represents an axis (e.g., x-axis, y-axis in FIG. 3) and each dot represents an individual force sensor electrode. In FIG. 5.1, seven force sensor electrodes are arranged as Chebyshev Type 1 points. In FIG. 5.2, seven force sensor electrodes are arranged as Chebyshev Type 2 points. In FIG. 5.3, seven force sensor electrodes are arranged as Legendre points. In FIG. 5.4, six force sensor electrodes are arranged as Chebyshev Type 1 points. In FIG. 5.5, six force sensor electrodes are arranged as Chebyshev Type 2 points. In FIG. 5.6, six force sensor electrodes are arranged as Legendre points. Other example arrangements follow Loboto points, Hermite points, Jacobi points, and Radau points. Other arrangements may be used.

In FIGS. 5.1-5.6, the lines of force sensor electrodes may be repeated across the sensing region. For example, if the line represents the x-axis, then the line may be repeated across the y-axis of the sensing region. FIG. 5.7 is an example of repeating the lines of force sensor electrodes across the sensing region to obtain a two dimensional layout of force sensor electrodes.

FIG. 5.7 shows a two dimensional top down view of two input surfaces in accordance with one or more embodiments of the disclosure. The image on the left shows an example layout of a 5×3 grid of force sensor electrodes on the input surface (500). As shown in the image on the left, the example has a uniform spacing on the x-axis and a non-uniform spacing along the y-axis. The image on the right shows an example layout of a 5×5 grid of force sensor electrodes on the input surface (502). In the example image on the right, the example has non-uniform spacing of force sensor electrodes along both axes. In the images, the shaded squares are the force sensor electrodes. The dotted lines between electrodes are for a visual aid to show the distances between force sensor electrodes on the same axis and do not exist. The dotted boxes (504) surrounding each image demarcates the effective bending area of the input surface. Outside of the dotted boxes, the input surface may not exhibit a bend.

Figure 6:
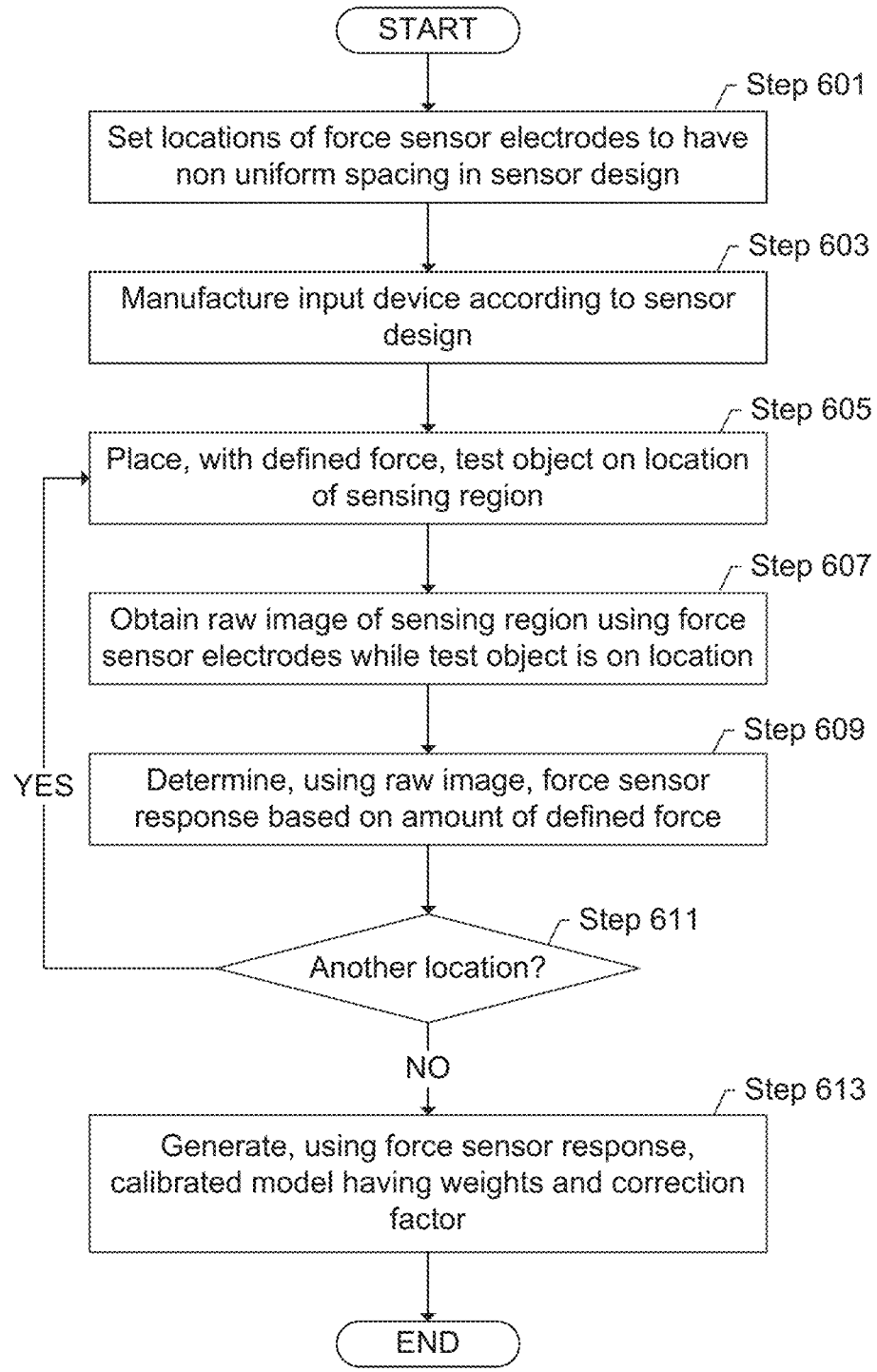
FIGS. 6 and 7 show flowcharts in accordance with one or more embodiments of the disclosure.
Figure 7:
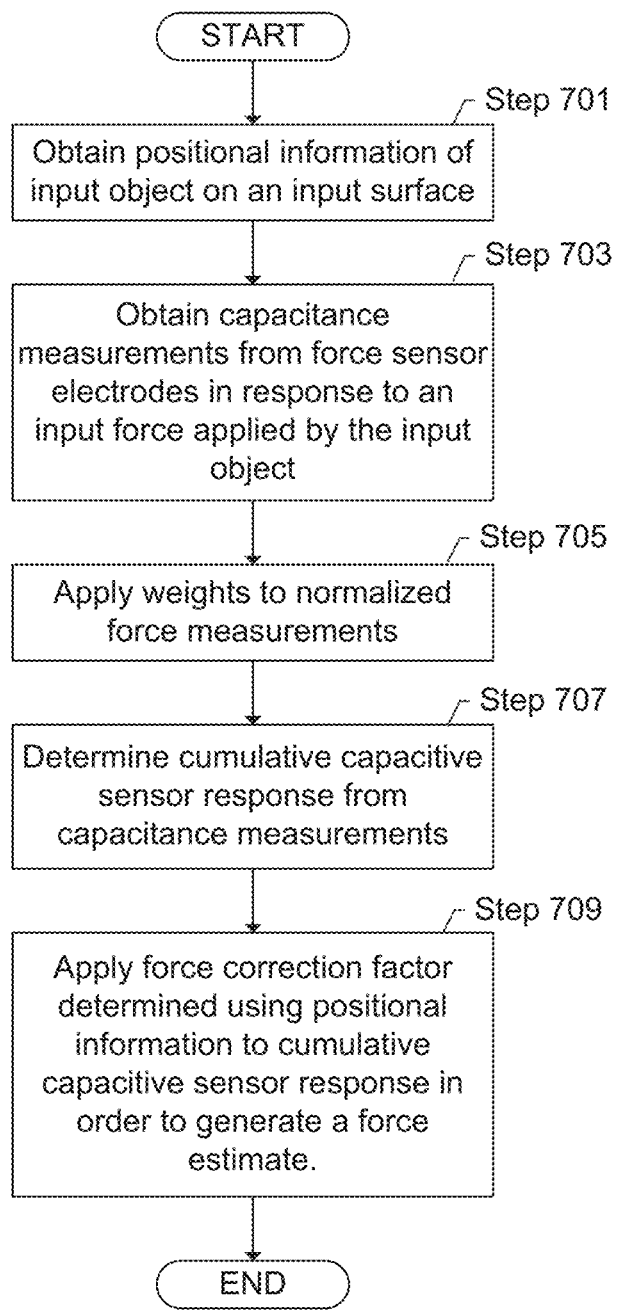

Turning to the flowcharts, FIG. 6 shows a flowchart for designing an input device having non-uniform spacing between electrodes to minimize the error. FIG. 7 shows a flowchart for operating the input device in accordance with one or more embodiments of the disclosure. Both of these flowcharts are discussed below.

While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 6, FIG. 6 shows a flowchart for designing a force sensor layout in accordance with one or more embodiments of the disclosure. In Step 601, locations of the force sensor electrodes are selected to have non-uniform spacing in a sensor design. For example, the locations may be selected to match one or more of the examples of FIGS. 5.1-5.6. Other locations may be selected.

In Step 603, the input device is manufactured according to the sensor design. The manufacturing process creates multiple input devices and electronic systems according to the sensor design, and other designs. Input devices that are manufactured are calibrated. The calibration may be performed on a single input device to obtain calibration parameters that are stored in multiple input devices, such as all input devices having the sensor design, all input devices of the manufacturing run, or another collection of input devices. Calibration is described in Steps 605-611.

In Step 605, a test object is placed on a location of the sensing region with a defined force. The test object is applied to the sensing region with a defined amount of force exerted in a defined direction on the sensing region. In one or more embodiments, the direction of the force is perpendicular to the plane of the sensing region. The amount of force is defined in that the amount of force is a fixed value. For example, a robot may exert a slug on the sensing region with a defined amount of force. By way of another example, the test object having a known weight may be placed on the sensing region, such that the force is caused by gravity of the test object. Other mechanisms may be used.

In Step 607, a raw image of the sensing region is obtained while the test object is on the location. In one or more embodiments, the raw image is obtained from absolute and/or mutual capacitive measurements of the sensing region. Absolute capacitance is determined by determining the amount of electric charge added to a force sensor electrode to increase the electric potential of the force sensor electrode by one unit. The amount of electric potential is affected by the distance to the housing and, subsequently, the compression of the compressible layer as affected by force. To determine the absolute capacitance, the force sensor electrodes are driven with a modulated sensing signal to determine the amount of electric charge. Measurements at each force sensor electrode are obtained. For example, the measurements may be obtained at once or at different times. Mutual capacitance measurements may be obtained by transmitting a transmitter signal with a transmitter electrode (e.g., a force sensor electrode). Resulting signals are received using another force sensor electrode, which is the receiver electrode. The resulting signals may be affected by the distance between the transmitter electrode and receiver electrode and, subsequently, the compression of the compressible layer as affected by force. Regardless of whether mutual capacitive measurements or absolute capacitive measurements are used, the measurements may be combined into a raw image.

In Step 609, the force sensor response is determined based on the defined amount of force and the raw image. For example, the raw image may be normalized using the defined amount of force. If the raw image includes positional measurements (e.g., force sensor electrodes measure both touch and position), then the raw image is processed to remove the positional information. Further processing may be performed to account for background capacitance, such as noise.

In Step 611, a determination is made whether another location exists to place the test object. In particular, a determination is made whether to move the test input object to a new location and obtain additional calibration data. In one or more embodiments, the number of positions is dependent on the amount of acceptable error as well as the amount of storage for data. In particular, each position results in storage of calibration data as well as a reduction in error for determining force. By having non-uniform spacing of sensor electrodes, the amount of error is reduced. Thus, the same number of locations as in the uniform spacing may result in less error. Further, an acceptable amount of error may be obtained even when storing less calibration data than in the uniform spacing scenario. The positions and number of positions may be predefined as configuration parameters based on the storage and error requirements. If a determination is made to use another location, the process repeats starting with Step 605.

Continuing with FIG. 6, in Step 613, using the force sensor response, a calibrated model having weights and a correction factor are generated. The weights may be applied to each force sensor electrode to account for the position of the input object. The weight applied to the capacitive measurement for a force sensor electrode accounts for the different capacitive sensor responses at the force sensor electrode based on the varying amount of deflection without a corresponding size variance. The weights may be normalized such that the sum of the weights is a predefined number (e.g., one). The correction factor is value applied to the cumulative capacitive sensor response. The correction factor is defined at least in part by the location of the input object. The correction factor accounts for the possibility that the amount of bend of the entire input surface, and corresponding cumulative capacitive sensor response of the entire input surface is different depending on the position of the input object in the sensing region. For example, when an input object is placed at the side of the sensing region, less total bend of the input surface may exist for an equal amount of force than when the input object is placed in the center of the sensing region. Thus, each location along the non-uniform axis has corresponding weights and a correction factor in accordance with one or more embodiments of the disclosure.

Turning to FIG. 7, FIG. 7 shows a flowchart for operating an input device having non-uniform spacing in accordance with one or more embodiments of the disclosure. In Step 701, positional information of an input object is obtained for an input object. In particular, the positional or touch sensor electrodes may operate according to a sensing technology (e.g., absolute or mutual capacitive, or other sensing technology) to obtain positional measurements. The positional measurements may be processed to identify the position of the input object on the input surface. The position along the axes is determined from the processing.

In Step 703, capacitance measurements are obtained from the force sensor electrodes in response to an input force applied by the input object. Obtaining the capacitive measurements may be performed as discussed above with respect to Step 607 of FIG. 6. Further, in some embodiments, obtaining the capacitive force measurements may be performed at the same time as obtaining the positional measurements, such as using the same electrodes. Thus, the raw image may include both capacitive force information and positional information. In such a scenario, the raw image may be processed to obtain a force image having only force measurements. Further processing may be performed to account for background noise, and to remove erroneous data.

In Step 705, the weights are applied to the normalized force measurements. Based on the positional information, the set of weights determined in FIG. 6 are obtained from storage. The weights may be pre-determined and independent of positional information, or may depend on positional information of the input object. Each capacitive force measurement is multiplied by the respective weight to obtain revised capacitive measurements.

In Step 707, a cumulative capacitive sensor response is determined from the revised capacitive measurements. In Step 709, a force correction factor determined using positional information is applied to the cumulative capacitive sensor response in order to generate a force estimate. The force information is determined using the cumulative capacitive sensor response. In one or more embodiments, the corrective factor matching the position of the input object is obtained. The cumulative capacitive sensor response may be multiplied by the correction factor to obtain a corrected cumulative capacitive sensor response. The correction factor may be based, for instance, on a table lookup or a formula such as a cubic interpolation between calibrated positions on the input surface. The corrected cumulative capacitive sensor response may be translated into a force value defining the amount of force of the input object.

For example, the processing system may determine a force estimate at a location by calculating a sum of ratios affected by the change in capacitive coupling for force electrodes multiplied by weights for the force electrodes. In some embodiments, the correction factor is identified by using a function based on the location of the input object, or based on a look-up table correlating the location of the input object along the non-uniform axis with correction factors. As another example, the processing system may estimate a force magnitude using the capacitance measurements, and apply a correction factor to the cumulative sensor response or an initial force estimate. Because of the non-uniform spacing of electrodes, the weights and correction factor may be more accurate resulting in a more accurate force estimate.

The force may be reported to a central processor of the input device. The central processor or processing system may use the force as user input requesting an action to be performed by the input device. For example, the input may be to select an item in the graphical user interface, open or close an application, provide further information, or performed another action.

FIGS. 8.1 and 8.2 show an example in accordance with one or more embodiments of the disclosure. The following example is for explanatory purposes only and not intended to limit the scope of the disclosure. FIG. 8.1 shows a graph (800) of example of using a test object on an input device with uniformly spaced electrodes at uniformly spaced points. In the graph (800), the vertical axis (802) is the deflection of the bending surface in response to an input object placed on the surface with a pre-defined amount of force. The horizontal axis (804) is the sensor electrode location. The Runge function (806) is chosen here as an example to approximate the actual bending response. Two additional lines are presented in the graph (800). The first line (808) shows the estimated bending response when the seven force sensor electrodes are at uniformly spaced locations. The second line (810) shows the estimated bending response when fifteen force sensor electrodes are at uniformly spaced locations. The vertical distance between the first line (808) and the Runge function (806) shows the error in estimated bending response at the location of the corresponding force sensor electrode. Similarly, the vertical distance between the second line (810) and the Runge function (806) shows the error in estimated bending response at the location of the corresponding force sensor electrode.

By way of comparison, FIG. 8.2 shows a graph (820) of example of using a test object on an input device with force sensor electrodes at non-uniformly spaced points. As with the graph (800) in FIG. 8.1, the graph (820), the vertical axis (822) is the deflection of the bending surface when a test input object is placed with a defined amount of force at a particular location. The horizontal axis (824) is the sensor electrode location. The Runge function (826) is chosen here to approximate the actual bending response. The first line (828) shows the estimated bending response when seven force sensor electrodes are placed at respective Chebyshev locations. The second line (830) shows the estimated bending response when fifteen force sensor electrodes are placed at respective Chebyshev locations. The vertical distance between the first line (828) and the Runge function (826) shows the amount of error in the estimated bending response at the seven locations of the seven force sensor electrodes. Similarly, the vertical distance between the second line (830) and the Runge function (826) shows the amount of error in estimated bending at the fifteen force sensor electrodes.

As shown by a comparison of the graph (800) in FIG. 8.1 and the graph (820) in FIG. 8.2, the amount of error (i.e., the vertical distances between the first line/second line and the Runge function is substantially reduced). Thus, spacing the electrodes at the Chebychev points provides less error in the example than using uniform spacing.

Thus, the embodiments and examples set forth herein were presented in order to best explain various embodiments and the particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising:
   an input surface having a bending response in a direction of a first axis and in a direction of a second axis, the bending response being in response to a force being applied to the input surface, wherein the bending response causes deflection of the input surface to vary at a plurality of locations on the input surface; and
   a plurality of force sensor electrodes, the plurality of force sensor electrodes disposed at the plurality of locations along the first axis and having non-uniform distances between adjacent force sensor electrodes along the first axis,
   wherein the non-uniform spacing is selected to reduce an error, at the plurality of locations, between a deflection predicted by a mathematical model of the bending response and the deflection associated with the bending response.

2. The input device of claim 1, further comprising:
   sensor circuitry configured to acquire a plurality of force measurements by modulating the plurality of force sensor electrodes; and
   a processing system configured to determine the force on the input surface using the plurality of force measurements.

3. The input device of claim 1, further comprising:
   a plurality of in-cell sensor electrodes comprising a first portion and a second portion, the first portion comprising the plurality of force sensor electrodes, wherein at least one in-cell sensor electrode of the second portion is in between two adjacent force sensor electrodes in the first portion.

4. The input device of claim 1, wherein a distance between the adjacent force sensor electrodes decreases from a center of the first axis to each edge of the first axis.

5. The input device of claim 1, wherein the non-uniform distances are symmetric about the center of the first axis.

6. The input device of claim 1, wherein the non-uniform distances are defined by Chebychev points on the first axis.

7. The input device of claim 1, wherein the non-uniform distances are defined by Legendre points on the first axis.

8. The input device of claim 1, wherein the plurality of force sensor electrodes further has non-uniform distances between adjacent force sensor electrodes along the second axis.

9. The input device of claim 8, wherein the non-uniform distances between adjacent force sensor electrodes along the second axis are different than the non-uniform distances between adjacent force sensor electrodes along the first axis.

10. An input device comprising:
    an input surface having a first axis, a second axis substantially orthogonal to the first axis, and a corner,
       wherein the input surface has a bending response in a direction of the first axis and in a direction of the second axis, the bending response being in response to a force being applied to the input surface, and
       wherein the bending response causes deflection of the input surface to vary at a plurality of locations on the input surface; and
    a plurality of force sensor electrodes, the plurality of force sensor electrodes comprising:
       a first force sensor electrode adjacent to the corner at a first location of the plurality of locations,
       a second force sensor electrode adjacent to the first force sensor electrode and located at a second location of the plurality of locations farther from the corner along the first axis than the first force sensor electrode, and
       a third force sensor electrode adjacent to the second force sensor electrode and located at a third location of the plurality of locations farther from the corner along the first axis than the second force sensor electrode,
       wherein a first distance between the first force sensor electrode and the second force sensor electrode is smaller than a second distance between the second force sensor electrode and the third force sensor electrode, and
       wherein the first distance and the second distance are selected to reduce an error, at locations of the first force sensor electrode and the second force sensor electrode, between a deflection predicted by a mathematical model of the bending response and the deflection associated with the bending response.

11. The input device of claim 10, wherein the first distance and the second distance are defined by Chebychev points.

12. The input device of claim 10, wherein the first distance and the second distance are defined by Legendre points.

13. The input device of claim 10, wherein the force sensor electrodes have non-uniform distances that are symmetric about the center of the first axis.

14. The input device of claim 10, further comprising:
    sensor circuitry configured to acquire a plurality of force measurements by driving the plurality of force sensor electrodes; and
    a processing system configured to determine the force on the input surface using the plurality of force measurements.

15. The input device of claim 14, further comprising:
a plurality of positional sensor electrodes,
wherein the sensor circuitry is further configured to acquire a plurality of positional measurements by modulating the plurality of positional sensor electrodes;
wherein the processing circuitry is further configured to:
determine a position of an input object along the second axis using the plurality of positional measurements,
wherein determining the force is based on the position.

16. The input device of claim 10, further comprising:
a display comprising a plurality of in-cell sensor electrodes, the plurality of in-cell sensor electrodes comprising the plurality of force sensor electrodes.

17. A processing system for an input device, the processing system comprising:
sensor circuitry configured to be coupled to a plurality of positional sensor electrodes, and a plurality of force sensor electrodes measuring at an input surface of the input device,
wherein the input surface has a bending response, the bending response being in response to a force being applied to the input surface, wherein the bending response causes deflection of the input surface to vary at a plurality of locations on the input surface, and
wherein the sensor circuitry is configured to:
obtain a plurality of force measurements from the plurality of force sensor electrodes, the plurality of force sensor electrodes disposed at the plurality of locations, having non-uniform distances between adjacent force sensor electrodes along an axis,
wherein the non-uniform distances are selected to reduce an error, at the plurality of locations, between a deflection predicted by a mathematical model of the bending response and the deflection associated with the bending response, and
obtain a plurality of positional measurements from the plurality of positional sensor electrodes; and
a processing circuitry configured to:
determine, using the plurality of positional measurements, a location of an input object on an input surface, and
determine, using the location and the plurality of force measurements, force information for the input object.

18. The processing system of claim 17, wherein determining the force information is performed based on a plurality of weights for the plurality of force sensor electrodes, the plurality of weights corresponding to the location of the input object.

19. The processing system of claim 18, wherein determining the force information comprises applying a force correction factor to a result of applying the plurality of weights to the plurality of force measurements.

20. The processing system of claim 18, wherein the non-uniform distances are defined by at least one selected from a group consisting of Chebychev points, Legendre points, Lobato points, Hermite points, Jacobi points, and Radau points.

* * * * *